Oct. 28, 1969 — L. P. ROSELL — 3,474,827
COUPLER AND ADAPTER AND SEAL STRUCTURE THEREFOR
Filed Feb. 9, 1966 — 2 Sheets-Sheet 1
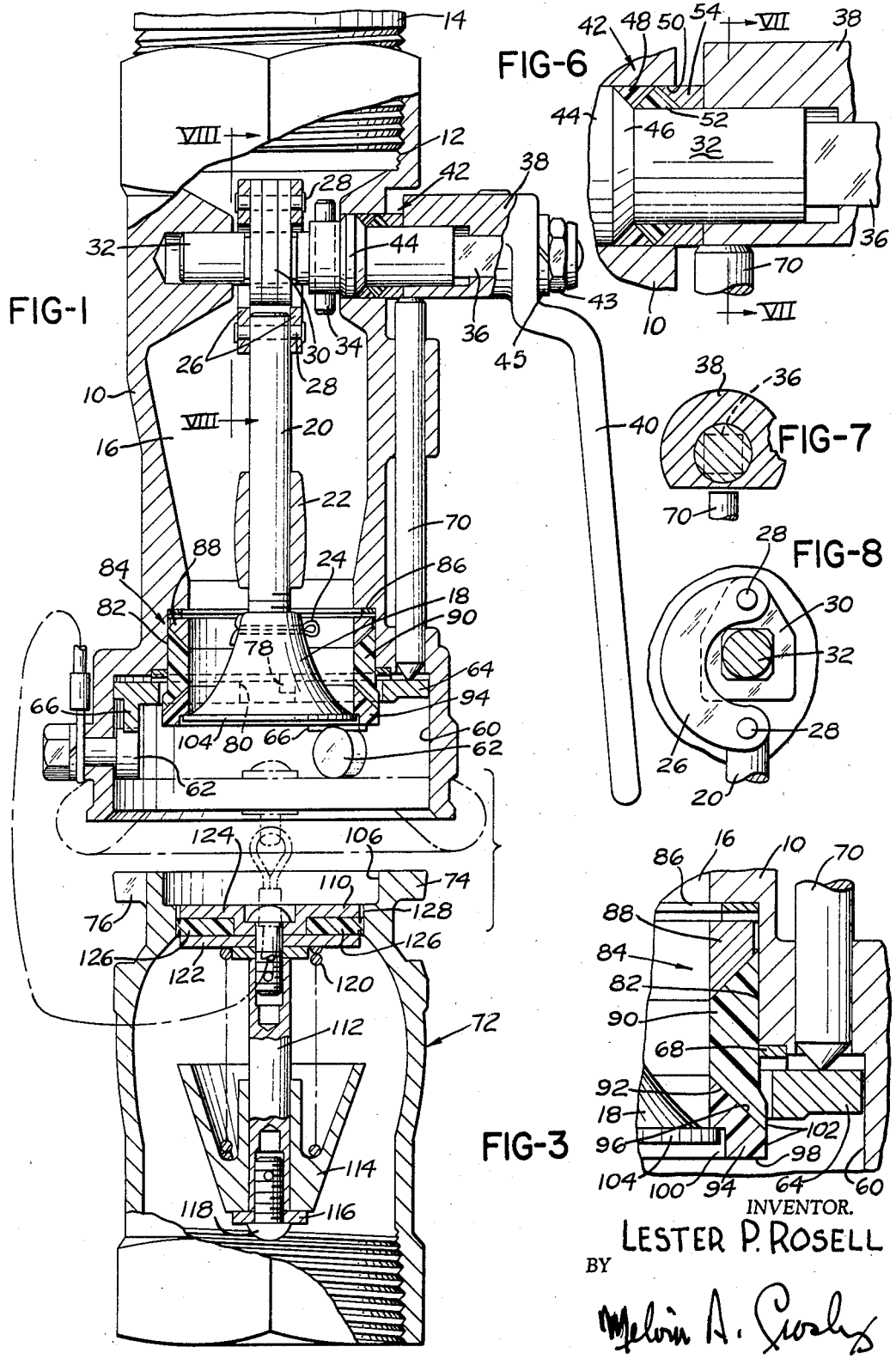
INVENTOR.
LESTER P. ROSELL
BY Melvin A. Crosby

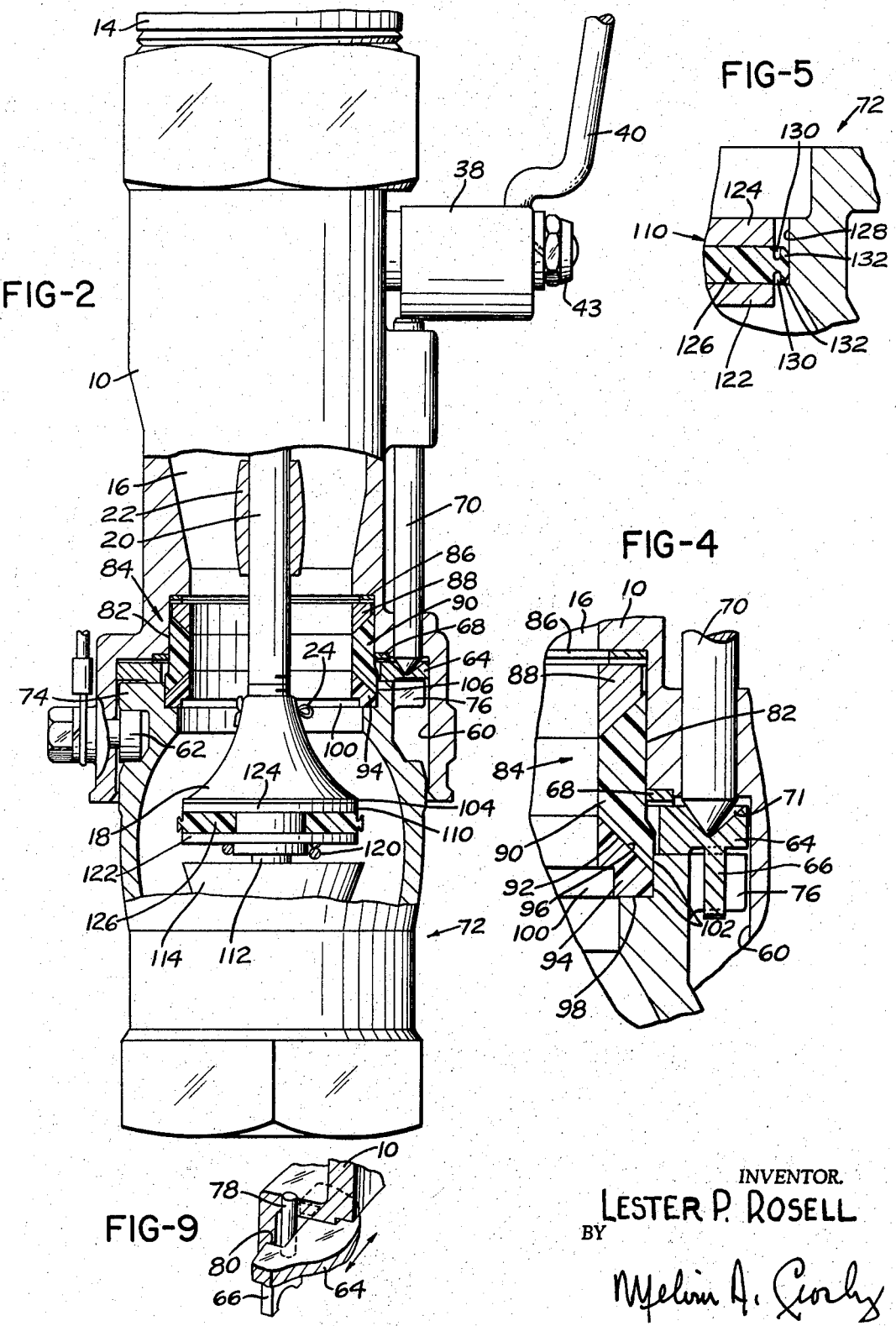

United States Patent Office 3,474,827
Patented Oct. 28, 1969

3,474,827
COUPLER AND ADAPTER AND SEAL STRUCTURE THEREFOR
Lester P. Rosell, Dayton, Ohio, assignor to Emco Wheaton, Inc., Dayton, Ohio, a corporation of Ohio
Filed Feb. 9, 1966, Ser. No. 526,107
Int. Cl. F16l 29/00, 37/28
U.S. Cl. 137—614.06     6 Claims

ABSTRACT OF THE DISCLOSURE

A coupler having a flow passage therethrough with the valve member at one end of the passage movable outwardly from the end of the passage to open the coupler and movable inwardly toward the end of the passage to close the coupler, and with a sleeve-like seal arrangement in the outlet end of the flow passage which consists of three coaxial rings of slightly resilient material and which have inclined side walls so that when the rings are pressed together by movement of the valve member into closed position, they will be displaced at least slightly in the radial direction and thereby form a fluid tight seal at the outlet end of the passage in the coupler body.

---

This application relates to couplers for coupling liquid lines together or for coupling a liquid hose to a receiver such as a tank or conduit or the like. The present invention, in particular, relates to a novel sealing arrangement for a coupler of the nature referred to.

Couplers, broadly, are known and may be employed any place that liquids are to be handled and controlled. For example, chemical industries, including the paint industry, the fuel industry and in other regions, couplers of the nature referred to find wide usage.

In the past it has been the practice to effect sealing of the couplers about the operating shaft therefor and about the valve member by rubber or rubber-like rings or sealing elements. In particular, rubber or a rubber-like material has been employed for sealing at the moveable valve member. Such sealing devices are quite satisfactory for many purposes but it is also the case that for wide application of the coupler, seals of this nature are defective because they may be attacked by the fluids being handled, or may be damaged by abrasive particles in the fluid or may fail for some other reason and are difficult to keep clean when handling such liquids as paint. The need has long existed for improved seals for a coupler of the nature referred to and it is in particular connection with the provision of such improved seals that the present invention is concerned.

A particular object of the present invention is the provision of novel improved sealing means for a coupler of the nature referred to.

A still further object of this invention is the provision of a novel sealing arrangement for an adapter member to which the coupler is coupled for fluid handling operations.

A still further object of the present invention is the provision of sealing means for a coupler of the nature referred to which is substantially insensitive to chemical attack and which, furthermore, is not easily abraded.

A still further object of the present invention is the provision of a sealing means for a coupler, particularly sealing means at the valve member of the coupler, to which material such as paint and varnish or the like will not readily adhere.

It is also an object of this invention to provide a relatively simple sealing arrangement for a coupler but which is highly effective for maintaining a tight seal when the coupler is closed.

The objects referred to above as well as still other objects and advantages of the present invention will become more apparent upon reference to the following detailed specification taken in connection with the accompanying drawings in which:

FIGURE 1 is a vertical sectional view through a coupler according to the present invention showing the coupler in closed position and disconnected from the associated adapter;

FIGURE 2 is a view like FIGURE 1 but shows the coupler connected to the adapter and with the coupler in open position;

FIGURE 3 is an enlarged fragmentary view of a portion of FIGURE 1 showing more in detail the seal arrangement according to the present invention;

FIGURE 4 is a view like FIGURE 3 but shows a portion of FIGURE 2 with the adapter coupled to the coupler and the coupler in open position;

FIGURE 5 is a fragmentary view drawn at enlarged scale showing the novel seal on the valve member or closure member of the adapter;

FIGURE 6 is a fragmentary view drawn at somewhat enlarged scale showing the seal arrangement surrounding the operating shaft of the coupler of FIGURE 1;

FIGURE 7 is a sectional view indicated by line VII—VII on FIGURE 6 showing the construction of a cam forming a portion of the interlock between the actuating lever of the coupler and an interlock plate also forming a part of the coupler and cooperating with the adapter;

FIGURE 8 is a sectional view indicated by line VIII—VIII on FIGURE 1 showing a part of the valve member actuating linkage; and FIGURE 9 is a fragmentary view showing the stages which limit the rotary movement of the interlock plate.

Referring to the drawings somewhat more in detail, the coupler illustrated in the drawings comprises a body 10 having inlet means at one end, comprising, for example, the female threads 12 for connection of the coupler to a member 14 which may be on the end of a conduit such as a hose or the like. The body 10 of the adapter has a flow passage 16 extending therethrough from the inlet end of the coupler to the outlet end thereof and which passage at the outlet end of the coupler is adapted for being closed by a valve member 18. Valve member 18 is threadedly connected to a rod 20 reciprocably guided in the valve body by a bored spider 22. The cotter key 24 may be employed to fix valve member 18 to rod 20 when the valve member is in a proper position of adjustment. While rod 20 is shown as guided by spider 22, it will be understood that this spider could be eliminated and valve member 18 guided, instead, by circumferentially spaced axially extending ribs thereon loosely fitting inside the cylindrical seal means at the discharge end of body 10.

At the end of rod 20 opposite its connection to valve member 18, the said rod is pinned to curved link means 26 (see FIG. 8). Link means 26 are, in turn, pinned at 28 to an eccentric actuating member 30 fixed to a rotatable shaft 32 which is journalled in the coupler body.

A pair of links 26 are preferably in the form of bent links so that the pivot pin at 28 can move from an overcenter position above shaft 32 to an overcenter position below shaft 32. The actuating member 30 is preferably in the form of link members fitted on a portion of shaft 32 which is machined with flats so that the said links are forced to rotate with the shaft. A roll pin 34 passes through shaft 32 adjacent one side wall of the coupler body and prevents the shaft from coming out of the coupler body once it has been assembled therewith.

Externally of the coupler body, shaft 32 has a squared portion 36 on which is mounted the hub 38 of an operating lever 40. Self-locking nut 43 is threaded on a threaded end part of the shaft and serves to retain the hub 38 of operating lever 40 on the shaft and likewise urges the hub inwardly toward the body of the coupler so as to compress a sealing means generally indicated at 42 and positioned within a bore in the coupler body and in surrounding relation to shaft 32.

It will be noted that spring lock washer 45 is positioned beneath nut 43 and this spring lock washer has the particular effect of maintaining hub 38 pressed against ring 54 so that the seal rings 48 and 52 are maintained under pressure at all time, thus maintaining them continuously in sealing engagement with the shaft and the bore in body 10.

As will be seen in FIGURE 6, shaft 32 has an enlarged portion 44 thereon with an inclined shoulder 46, formed at about 45 degrees, and presented toward the aforementioned sealing means 42. Sealing means 42 comprises a first seal ring 48 triangular in cross section and having one face engaging inclined shoulder 46 and another face fitting closely in bore 50 in the coupler body. The sealing means comprises a second seal ring 52 similar to ring 48 except reversed therefrom so that one surface of ring 52 embraces shaft 32 rightwardly of enlarged portion 44 and another surface thereof engages the third side of ring 48. Rings 48 and 52 are preferably made of a slippery chemically resistant plastic material such as the material known as Teflon, which is the name by which the material tetrafluoro ethylene is known in the trade.

The sealing means comprises still a third follower ring 54 which has an outer-cylindrical surface fitting fairly closely in bore 50 and an inner cylindrical surface relatively closely embracing shaft 32. Ring 54 has a radial surface abutted by the body end of hub 38 and an inclined surface engaging the inclined surface on the right side of ring 52. It will be evident at this point that when hub 38 is forced toward coupler body 10 by tightening of nut 43, the ring 54 which is of metal, such as aluminum or the like, is forced against ring 52 and this ring in turn, is forced against ring 48 and this ring in its turn is forced against inclined shoulder 46 of shaft 32.

The three rings will thus be in sealing engagement with each other while ring 52 will be urged into sealing engagement with shaft 32 and ring 48 will be urged into sealing engagement with bore 50 of body 10 and also with inclined shoulder 46 of shaft 32. The net result is a superior sealing action but one in which the shaft 32 will still turn relatively freely due to the slippery nature of rings 48 and 52.

At the valve member, or outlet end of body 10 there is provided a larger cylindrical cavity 60 within which is mounted in circumferentially spaced relation, the stud elements 62 of which there are usually three. These stud elements cooperate with an adapter to be described hereinafter and also with an interlock plate 64. Interlock plate 64 is provided in the bottom of recess 60 and has notched axial projections 66 thereon which engage the tops of studs 62. A wave washer 68, which is an annular washer that undulates in the direction of its circumference, urges the interlock plate toward studs 62 so that it is not readily dislodged therefrom.

Interlock plate 64 forms a part of an interlock system that prevents the valve member from being opened until the coupler is properly mounted on an adapter and also prevents the coupler from being removed from the adapter until the valve member 18 is closed. The interlock referred to comprises an interlock rod or pin 70 reciprocably carried by the valve body and bearing on interlock plate 64 at its lower end and on hub 38 at its upper end.

As will be seen in FIGURE 1, and also in FIGURE 6, hub 38 is eccentric with respect to shaft 32 and when the coupler is closed, the large part of hub 38 is upwardly and the small part is on the bottom. If interlock plate 64 is positioned so as to prevent downward movement of rod or pin 70 from its FIGURE 1 position, it will not be possible to rotate lever 40 to open the coupler. However, upon rotation of interlock plate 64 to a predetermined position, as will occur when the coupler is properly mounted on the adapter, a pocket in the interlock plate presents itself to rod or pin 70 and this will permit this member to move downwardly and release lever 40 for opening of the coupler.

The aforementioned adapter is indicated generally at 72 of FIGURE 1 and has on its end adjacent the coupler a flange portion 74 receivable within recess 60 and having notches 76 through which studs 62 will pass and which notches will engage the projections 66 of interlock plate 64. When the coupler is seated on the adapter, the coupler can be rotated relative to the adapter and the interlock plate, because of its engagement with the adapter, will remain stationary.

A predetermined amount of rotation of the coupler will bring pin or rod 70 into alignment with a pocket in interlock plate 64 and at this time the coupling of the coupler to the adapter is completed and the coupler can be opened. This pocket will be seen at 72 in FIGURE 4. After the coupler has been opened, of course, pin or rod 70 extends into pocket 71 of interlock plate 64 and disconnection of the coupler from the adapter is not possible until the coupler is again closed.

The amount of travel of the interlock plate 64 angularly within the coupler body is under the control of a pin 78 (see FIGURE 9), which extends downwardly into the upper end of recess 60 and engages a notch 80 formed in the peripheral edge of the interlock plate. In one stopped position of the interlock plate the notched projections 66 thereof are resting on the studs 62, while in the other stopped position of the interlock plate, the pocket for receiving pin or rod 70 is aligned therewith.

Returning at this point to the coupler, there is a second cylindrical recess 82 formed therein extending axially inwardly into the coupler body from the bottom of recess 60. Located within recess 82 is a sleeve-like sealing means generally represented at 84 which seals the coupler body to valve member 18 when the latter is closed and which also seals the coupler body to adapter 72 when the said adapter is mounted on the coupler. The sealing means will be more clearly seen in FIGURE 3 where it is drawn at enlarged scale. In FIGURE 3 it will be noted that, commencing at the bottom of recess 82, there is provided a pair of wave washers 86 and resting on wave washers 86 is a metal follower ring of brass or aluminum or stainless steel or the like, indicated at 88 and which is urged downwardly in recess 82 by wave washers 86. Ring 88 has a slight diametral clearance in recess 82.

The lower or outer face of ring 88 is cut off on a bevel, 45 degrees, for example, and this face rests on the correspondingly inclined face of seal ring 90 which, as in connection with rings 48 and 52 is preferably formed of Teflon. Ring 90 has less diametral clearance in recess 82 than ring 88 and is, in fact, a close fit in the recess. The inclined faces of rings 88 and 90 that were referred to are so arranged as to converge in a direction outwardly of recess 82. At the opposite end of ring 90 and the other end face thereof, at 92, is inclined in the opposite direction, again at about 45 degrees. Resting on surface 92 is a terminal or end seal ring 94 having an inclined face 96 which engages inclined face 92 of ring 90. Faces 92 and 96 are so inclined as to converge inwardly of recess 82. The outer end of ring 94 is formed with a flat annular surface at 98 and a counterbore at 100.

Still further, the peripheral portion of ring 94 and the adjacent peripheral portion of the adjacent end of ring 90 are formed to a diameter somewhat larger than the diameter of recess 82 and are smoothly cylindrical as indicated at reference numeral 102.

Valve member 18 has a radially outwardly extending flange portion 104 which is received within counterbore 100 and which engages the shoulder at the bottom of the counterbore. At this point it will be apparent that adjustment of valve member 18 on stem or rod 20 can be accomplished such that when the coupler is closed, the rings 88, 90 and 94 are tightly clamped between flange 104 of valve member 18 and wave washers 86 at the bottom of recess 82. As in connection with sealing means 42 previously described, this clamping of the rings together will hold the rings in sealing engagement with each other and will hold ring 94 in sealing engagement with flange 104 of valve member 18 and will also, because of the inclined surfaces on the opposite ends thereof, urge ring 90 into sealing engagement with the cylindrical surface of recess 82.

An extremely efficient seal is accomplished in this manner which will hold all fluids while, at the same time, the members of the sealing means are relatively inexpensive and easy to make, and are not subject to abrasion and are highly resistant to chemical attack. No great degree of deformation of the sealing ring members is required to accomplish the aforesaid sealing so that there is no rapid fatiguing of the sealing members and long life thereof will be had. The described sealing means remains effective up to a fairly high temperature.

The seal 84 is also effective for sealing the coupler to the adapter as will best be seen in FIGURE 2. In FIGURE 2 it will be observed that the coupler end of the adapter comprises a recess 106 of a size closely to receive the aforementioned enlarged diameter portion 102 of sealing means 84. When the adapter is mounted on the coupler body as shown in FIGURE 2, the seal means 84 is compressed between the shoulder at the bottom of recess 106 and the wave washers 86 at the bottom of recess 82 and this holds the ring elements of the sealing means in sealing relation with each other while the lowermost ring element 94 is held in sealing engagement with the shoulder at the bottom of recess 106 and the lower end of ring element 90 is pressed into sealing engagement with the peripheral portions of both of recess 82 and 106 because of the inclined surfaces on the ends thereof.

When the coupler and adapter are interconnected as shown in FIGURE 2 the actuating lever 40 can be rotated to move stem 20 and valve member 18 downwardly to the position in which they are illustrated in FIGURE 2 and this will also open the adapter and liquid can then pass through the coupler and adapter into whatever receiver is connected to the adapter. The adapter, it will be noted, comprises a disc like valve member 110 attached to a stem 112 that extends downwardly through a spider 114. A stop washer 116 and screw 118 are attached to stem 112 at the bottom of the spider 114 to provide an upper stopped position for disc 110. A compression spring 120 bears between the spider and the bottom side of disc 110 and biases it toward its FIGURE 1 position.

Disc 110 comprises a first metal disc 122 and a second metal disc 124, one or both of which may be stepped to provide an annular face for receiving a Teflon seal ring or disc 126. Teflon seal ring 126 extends radially outwardly beyond the periphery of metal discs 122 and 124 and engages the smooth walled reduced diameter portion 128 of the adapter body. The peripheral portion of Teflon disc 126 is axially grooved as by groove 130 to form lips 132 which, when pressure is developed on the pertaining side of the disc, will sealingly engage reduced diameter portion 128 of the adapter body thereby providing for a highly effective seal of the adapter even when the disc 126 does not engage region 128 of the adapter body under high pressure.

It will be evident that the grooving of both sides of disc 126 makes it readily reversible and eliminates the need for care in assembling the disc with the metal discs 122 and 124.

From the foregoing it will be seen that all critical points in the coupler and adapter according to the present invention seals are provided to which materials such as paint, varnishes and the like do not tend to adhere. The preferred material to employ for the seal elements is tetrafluoro ethylene, known as Teflon, and which is a representative one of a class of plastic materials which are characterized in being substantially completely non-porous and slippery so that materials do not tend to adhere thereto.

In addition, the seal elements are highly resistant to abrasion so that liquids containing abrasive particles can be handled and the seal elements will still provide good service for a long time. The seal elements are resistant to chemical attack to a higher degree than rubber or rubber-like materials and thus do not tend to deteriorate or swell when handling liquids that would effect or cause this sort of reaction with rubber or rubber-like seals.

Furthermore, the Teflon seals are less sensitive to temperature than rubber or rubber-like seals.

The seal arrangement is such that removal of valve member 18, by pulling cotter key 24 and unthreading the valve member from stem 20 will permit replacement of the seals, if necessary.

What is claimed is:

1. A coupler for connecting a fluid conduit to an adapter comprising; a body having an inlet end and an outlet end and a flow passage extending therethrough from one said end to the other, a poppet valve member at the outlet end of the body having a radial peripheral flange and movable axially outwardly of the body to open the coupler and axially inwardly of the body to close the coupler, actuating means for the valve member carried by said body, a cylindrical recess in the outlet end of the coupler body coaxial with said valve member having a smooth peripheral wall and a shoulder at the bottom, sleeve-like seal means telescopically fitting in said recess and disposed between said shoulder and said flange, said seal means comprising a plurality of individual ring means in stacked relation including an axially short first ring adjacent said flange, an axially short second ring adjacent said shoulder, and a third sleeve-like ring substantially larger than said first and second rings and positioned between said first and second rings, said third ring having its opposite end faces conical and inclined toward the other in a direction toward the axis of said recess, said first and second rings having their end faces adjacent said third ring conical so as fully to engage the end faces of said third ring, clamping of said rings together under axial pressure causing said third ring to expand radially into sealing engagement with the peripheral wall of said recess, movement of said valve member into its coupler closing position causing the said flange on the valve member to engage first ring and clamp said rings between said flange and said shoulder in sealing engagement with each other and with said third ring in sealing engagement with said peripheral wall of said recess and said first ring in sealing engagement with said flange, said first and third rings being formed of a smooth slippery at least slightly resilient plastic material, and means disposed in the bottom of said recess between said shoulder and said second ring resiliently biasing said seal means axially outwardly in said recess, said first ring and said third ring at the end portion thereof adjacent said first ring projecting axially outwardly from the mouth end of said recess and being adapted sealingly to engage a second recess formed in an adapter connected to said coupler.

2. A coupler according to claim 1, in which the outer end of said first ring is counterbored to receive said flange on the valve member, and the first ring and a portion of the adjacent end portion of said third ring which projects outwardly from the mouth end of said recess are larger in diameter than the recess in said coupler body.

3. A coupler according to claim 1, which includes an adapter adapted to be connected to the outlet end of said coupler body, a second recess in the adapter for receiving said first ring and the adjacent end portion of said third ring which projects from the recess in said coupler body, and means for connecting said adapter to said coupler body while simultaneously clamping said seal means between the bottoms of the recesses in said coupler body and adapter thereby to cause said third ring to expand radially into sealing engagement with the peripheral walls of said recesses.

4. A coupler according to claim 1, in which said first and third rings are formed of polytetrafluoroethylene.

5. A coupler according to claim 3 in which said adapter includes a disc-like valve member disposed in the coupler end of said adapter and movable inwardly of said adapter to permit fluid flow therethrough, said disc-like valve member being spring urged toward the valve member of said coupler and being moved inwardly of the adapter by the valve member of the coupler when the latter moves in its coupler opening direction.

6. A coupler according to claim 5 in which said disc-like valve member includes a disc of polytetrafluoroethylene having a peripheral wall adapted for sealing engagement with an annular region of said adapter when the adapter is closed, said disc having annular axial grooves in its opposite faces adjacent the said peripheral wall forming thin sealing lip on the said disc.

References Cited

UNITED STATES PATENTS

| | | | |
|---|---|---|---|
| 2,744,774 | 5/1956 | Wist | 277—87 |
| 3,188,048 | 6/1965 | Sutherland | 277—115 |
| 2,931,671 | 4/1960 | Beeley | 277—190 XR |
| 3,132,869 | 5/1964 | Campbell | 277—190 XR |
| 3,168,125 | 2/1965 | Rosell | 137—614.06 XR |
| 3,171,492 | 3/1965 | Cochran | 277—117 XR |
| 3,251,379 | 5/1966 | Lebow | 137—614.6 XR |

WILLIAM F. O'DEA, Primary Examiner

HOWARD M. COHN, Assistant Examiner

U.S. Cl. X.R.

251—149.6; 277—84, 87, 117